(12) United States Patent
Burnham et al.

(10) Patent No.: US 8,899,331 B2
(45) Date of Patent: Dec. 2, 2014

(54) CARBON SEQUESTRATION IN DEPLETED OIL SHALE DEPOSITS

(75) Inventors: Alan K. Burnham, Livermore, CA (US); Susan A. Carroll, Oakland, CA (US)

(73) Assignees: American Shale Oil, LLC, Newark, NJ (US); Lawrence Livermore National Security, LLC, Livermore, CA (US)

( * ) Notice: Subject to any disclaimer, the term of this patent is extended or adjusted under 35 U.S.C. 154(b) by 455 days.

(21) Appl. No.: 13/121,550

(22) PCT Filed: Sep. 30, 2009

(86) PCT No.: PCT/US2009/059006
§ 371 (c)(1),
(2), (4) Date: Mar. 29, 2011

(87) PCT Pub. No.: WO2010/039818
PCT Pub. Date: Apr. 8, 2010

(65) Prior Publication Data
US 2011/0174507 A1  Jul. 21, 2011

Related U.S. Application Data

(60) Provisional application No. 61/102,256, filed on Oct. 2, 2008.

(51) Int. Cl.
*E21B 36/00* (2006.01)
*E21B 41/00* (2006.01)

(52) U.S. Cl.
CPC ............ *E21B 41/0064* (2013.01); *Y02C 10/14* (2013.01)
USPC .......................................... 166/302; 166/300

(58) Field of Classification Search
None
See application file for complete search history.

(56) References Cited

U.S. PATENT DOCUMENTS

| | | | | |
|---|---|---|---|---|
| 3,939,057 A | * | 2/1976 | Reed, Jr. ........................ | 208/407 |
| 4,401,553 A | * | 8/1983 | Faudel ........................... | 208/402 |
| 2003/0080604 A1 | * | 5/2003 | Vinegar et al. ................. | 299/14 |
| 2003/0131995 A1 | * | 7/2003 | de Rouffignac et al. ... | 166/272.1 |
| 2003/0131996 A1 | * | 7/2003 | Vinegar et al. ............. | 166/272.1 |
| 2004/0200618 A1 | * | 10/2004 | Piekenbrock .............. | 166/305.1 |
| 2007/0193743 A1 | | 8/2007 | Harris et al. | |

FOREIGN PATENT DOCUMENTS

| | | |
|---|---|---|
| CA | 2662544 A1 | 10/2010 |
| EP | 1801346 A1 | 6/2007 |
| WO | WO0181716 A2 | 11/2001 |

OTHER PUBLICATIONS

IPCC Special Report on Carbon Dioxide Capture and Storage; 2005; Chapter 7.*
Malicse; Mineralogy and Geochemistry of the Parachute Creek Member of the Green River Formation, Piceance Basin, Colorado, U.S.A.; 2011; pp. 1-20.*

(Continued)

*Primary Examiner* — Doug Hutton, Jr.
*Assistant Examiner* — Anuradha Ahuja
(74) *Attorney, Agent, or Firm* — Faegre Baker Daniels LLP

(57) ABSTRACT

A method and apparatus are described for sequestering carbon dioxide underground by mineralizing the carbon dioxide with coinjected fluids and minerals remaining from the extraction shale oil. In one embodiment, the oil shale of an illite-rich oil shale is heated to pyrolyze the shale underground, and carbon dioxide is provided to the remaining depleted oil shale while at an elevated temperature. Conditions are sufficient to mineralize the carbon dioxide.

38 Claims, 16 Drawing Sheets

(56) References Cited

OTHER PUBLICATIONS

Taylor et al.; The Disposition of Sulfur During the Oxidation and Subsequent Leaching of Retorted Oil Shale; Mar. 1982; pp. 1-25.*

International Search Report issued in PCT/US2009/059006, mailed May 3, 2010, 6 pages.

Mercier, et al. U.S . Geological Survey Oil Shale Assessment Team, 2009. Fischer Asays of Oil Shale Drill Cores and Rotary Cuttings from the Piceance Basin, Colorado—2009 Update: U.S. Geological Survey Open-File Report 98-483, Version 2.0, 16pgs.

Xu, T. et al., 'Mineral Sequestration of Carbon Dioxide in a Sandstone-Shale System', Earth Sciences Division, Lawrence Berkeley National Laboratory, University of California, Berkeley, CA 94720, USA, Jul. 9, 2004, pp. 50. Retrieved from: eScholarship, University of California. http://escholarship.org/uc/item/9jx243hn.

* cited by examiner

CARBON SEQUESTRATION IN DEPLETED OIL SHALE DEPOSITS

CROSS-REFERENCE TO RELATED APPLICATIONS

The present application claims the benefit of U.S. Provisional Application Ser. No. 61/102,256, titled the same, filed on Oct. 2, 2008, the disclosure of which is hereby incorporated by reference in its entirety.

This invention was made under a CRADA TC02131 between American Shale Oil LLC and Lawrence Livermore National Laboratory operated for the United States Department of Energy. The Government has certain rights in this invention.

FIELD OF THE INVENTION

The present invention generally relates to the sequestration of carbon dioxide during hydrocarbon production and more particularly, the sequestration of carbon dioxide in depleted oil shale deposits.

BACKGROUND

Carbon sequestration is a technique for long-term storage of carbon dioxide ($CO_2$) to reduce the carbon footprint of hydrocarbon production. The sequestration of $CO_2$ as a way of mitigating the impact of fossil fuel use on global climate change is currently the subject of research.

One way of inhibiting the escape of $CO_2$ into the atmosphere is by mineralization. Mineralization involves reacting gaseous $CO_2$ with materials to form either solids or soluble salts, which may be stored in the Earth's crust. Several groups are investigating underground mineralization associated with injection into deep saline aquifers, and have concluded that the kinetics show that it takes many years to mineralize $CO_2$. While the prospect of mineralization of $CO_2$ underground would solve many problems associated with the release of carbon into the atmosphere, no practical system to accomplish this has been demonstrated. Thus there is a need in the art for a method and apparatus that permits the permanent sequestration of carbon gases.

SUMMARY

The present application addresses some of the disadvantages of known systems and techniques by providing a method and apparatus for the sequestration of $CO_2$ by underground mineralization in locations in which kerogen has been extracted in situ from oil shale deposits.

In general, underground oil shale deposits include kerogen and other materials that may include, but are not limited to, dolomite, calcite, quartz, feldspar, clay minerals, apatite, analcime, and iron sulfides. The clay minerals may include, for example and without limitation, one or more of a kaolinite, a montmorillonite, a smectite, chlorite, a muscovite, or the like.

Under the proper conditions, materials may be available or may be made available to react with carbon-containing gases, such as $CO_2$, to mineralize the gases. Mineralizing the $CO_2$, for example, sequesters the carbon underground in a solid or soluble-salt form. For example, some clay materials may form carbonates, such as, for example, magnesite or dawsonite, with carbon dioxide. The carbonate is contained or sequestered in the ground, which effectively reduces the carbon dioxide released to the atmosphere by the hydrocarbon production.

In one embodiment, kerogen is preferentially extracted from oil shale deposits in situ, leaving at least some of the other materials underground. To extract the kerogen, in situ, the oil shale may be heated in underground retorts to the pyrolysis temperature to allow the generated oil and gas to be removed via a production well as desired. Removing Inc kerogen may result in fracturing and porosity of the remaining material. Some or all of the $CO_2$ generated during kerogen extraction may be stored in the voids caused by the fracturing and porosity.

$CO_2$ may be mineralized by reacting with clay minerals, feldspars, sulfides, or natural carbonates. In one embodiment, the clay minerals include illites. In another embodiment the minerals may include dolomite.

In an embodiment where kerogen is extracted in situ by pyrolysis at elevated temperatures, the generated oil and gas is removed through, for example, a production well, leaving other materials underground, such as the above mentioned clays. $CO_2$ may be sequestered within the in situ extraction location by injection and mineralization reactions with some or all of the remaining material at an elevated temperature, effectively using excess heat from pyrolysis to facilitate mineralization to sequester $CO_2$.

Oxygen ($O_2$) may be added to react with underground minerals to increase the temperature to promote mineralization reactions. Thus, for example, and without limitation, $O_2$ may by be supplied, to the reaction area to oxidize with, for example, residual char from pyrolysis and for iron sulfides to increase or maintain the temperature of the underground reaction area. The oxygen can also be used to adjust the oxidation state of iron and other metals to promote selected mineralization reactions.

To facilitate the mineralization, other materials may be supplied with or separate from the $CO_2$. The other materials include, but are not limited to, brines, which may be concentrated from nearby natural gas wells, onsite aquifers, or the like. The materials may also include materials such as ammonia or sodium hydroxide to modify the pH or the injected fluids.

In one embodiment, a method of sequestering carbon-containing gases provides for injecting the carbon-containing gases into an underground region that includes clay minerals, and containing the carbon-containing gases for a sufficient time to mineralize the carbon-containing gases. In one embodiment, the underground region previously included an oil shale deposit having a clay mineral content greater than about 10 weight percent (wt %). In another embodiment, the underground region previously included an of shale deposit having 10 wt % of clay minerals and other minerals that may supply sodium potassium, magnesium, calcium or iron to a mineralization reaction with carbon-containing gases. The other minerals that include sodium, potassium, magnesium, calcium, or iron may include clay minerals or may include, without limitation, chlorites, feldspars, analcime, iron sulfides, or apatite.

In one embodiment, the illite concentration in, the oil shale deposit is approximately 5 wt %. In another embodiment, the illite concentration in the oil shale deposit is between approximately 45 wt % and approximately 55 wt %. In yet another embodiment, the illite concentration in the oil shale deposit is between approximately 40 wt % and approximately 60 wt %. In one embodiment, the illite concentration in the oil shale deposit is between approximately 30 wt. % and approximately 70 wt %. In another embodiment, the illite concentration in the oil shale deposit is between approximately 20 wt % and approximately 70 wt %. In yet another embodiment, the illite concentration in the oil shale deposit is between approximately 10 wt % and approximately 70 wt %.

In various embodiments, the illite concentration in the oil shale deposit is: greater than approximately 10 wt %; greater than approximately 20 wt %; greater than approximately 30 wt %; greater than approximately 40 wt. %; greater than approximately 45 wt %; or greater than approximately 50 wt %.

In another embodiment, the underground region previously included an oil shale deposit having 20 wt % of clay minerals and other minerals that may supply sodium, potassium, magnesium, calcium, or iron to a mineralization reaction with carbon-containing gases. The other minerals that include sodium, potassium, magnesium, calcium, or iron may include day minerals or may include, without limitation, feldspars, analcime, iron sulfides, or apatite.

In one embodiment, the concentration of clay and other minerals in the oil shale deposit is approximately 50 wt %. In another embodiment, the concentration in the oil shale deposit is approximately 45 wt % and approximately 55 wt %. In yet another embodiment, the concentration in the oil shale deposit is between approximately 40 wt % and approximately 60 wt %. In one embodiment, the concentration in the oil shale deposit is between approximately 30 wt % and approximately 70 wt %. In another embodiment, the concentration in the oil, shale deposit is between approximately 20 wt % and approximately 70 wt %.

In various embodiments, the concentration of day and other minerals in the oil shale deposit is greater than approximately 20 wt %; greater than approximately 30 wt %; greater than approximately 40 wt %; greater than approximately 45 wt %; or greater than approximately 50 wt %.

In one embodiment, mineralization of carbon-containing gases is facilitated by containing the carbon-containing gases in the underground region at a pressure of less than the hydrostatic pressure of the underground region.

In another embodiment, mineralization of carbon-containing gases is facilitated by containing the carbon-containing gases in the underground region at a pressure of less than 0.8 times the hydrostatic pressure of the underground region.

In yet another embodiment, mineralization of carbon-containing gases is facilitated by containing the carbon-containing gases in the underground region at a pressure of less than 1.2 times the hydrostatic pressure of the underground region.

In one embodiment, mineralization of the carbon-containing gases is facilitated by containing the carbon-containing gases in the underground region at a pressure of less than 1.5 times the hydrostatic pressure of the underground region.

In one embodiment, mineralization of the carbon-containing gases is facilitated by containing the carbon-containing gases in the underground region at a pressure of less than 2.0 times the hydrostatic pressure of the underground region.

These features together with the various ancillary provisions and features which will become apparent to those skilled in the art from the following detailed description are attained by the apparatus and method of the present disclosure, preferred embodiments thereof being shown herein.

DETAILED DESCRIPTION

Provided herein is a method and apparatus that permits the permanent sequestration of carbon gases. The present application provides a method for the sequestration of $CO_2$ by underground mineralization in locations in which kerogen has been extracted in situ from oil shale deposits. The methods and apparatuses discussed herein are exemplary embodiment of the technology of the present application. The word "exemplary" is used herein to mean "serving as an example, instance, or illustration." Any embodiment described as "exemplary" is not necessarily to be construed as preferred or advantageous over other embodiments described herein. Moreover, any embodiments described should be considered exemplary unless otherwise specifically defined.

Figure 1:
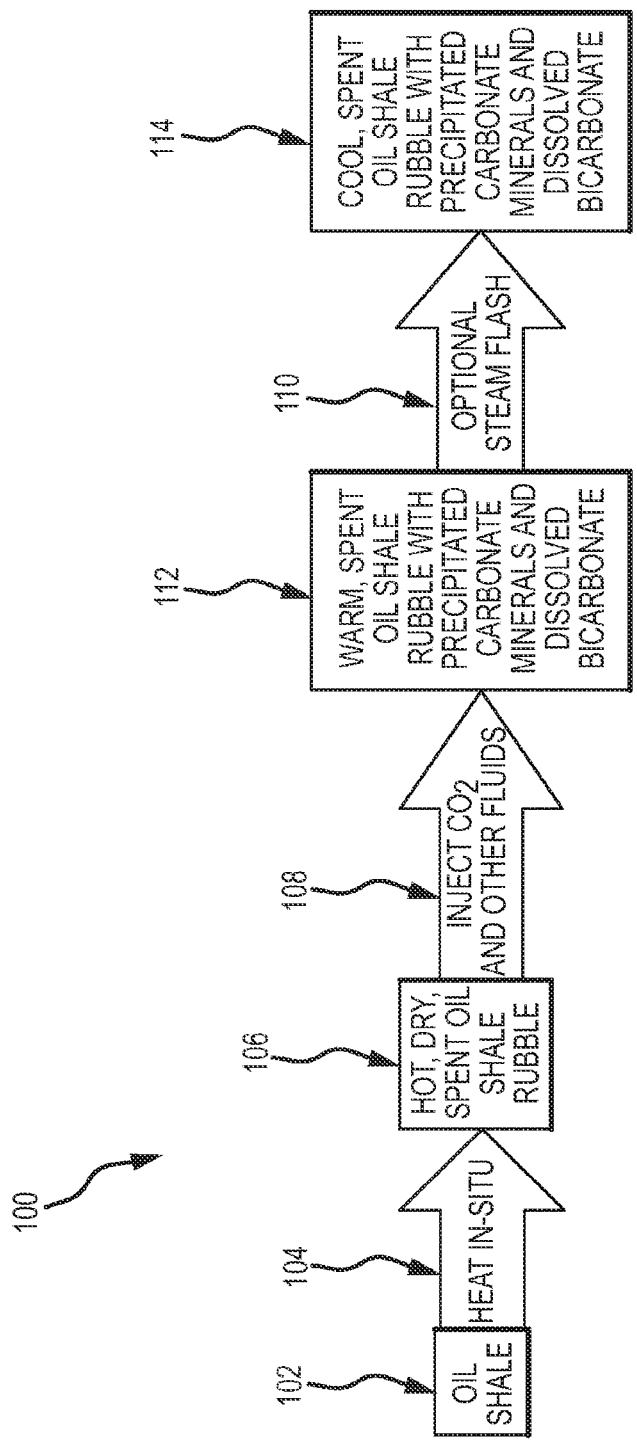
FIG. 1 is a functional block diagram illustrating an exemplary method of carbon sequestration in depleted oil shale deposits.

Referring first to FIG. 1, a flow chart 100 provides a flowchart of an exemplary method of implementing the technology of the present application. Broadly, the steps in the method are as follows. First, a suitable oil shale formation that is isolated from aquifers that can be used for agriculture or human consumption and is deep enough to contain gas pressures greater than 40 atmospheres is identified or located, step 102. Next, an external heat source is used to convert the kerogen in the oil shale in-situ to of and gas by heating over a period of a few week to a few years at temperatures below 400° C., step 104. Once sufficiently fluid, the oil and gas is removed from the oil shale formation to the surface creating porosity and permeability in the oil shale formation (typically referred to as the depleted oil shale), step 106. $CO_2$ generated during the heating is captured on the surface and injected into the depleted oil shale, step 108. Optionally, the injected $CO_2$ may be injected in combination with water, dissolved salts, ammonia, oxygen, or any combination thereof, step 110. The $O_2$ may be used to maintain the temperature of the retort between 100 and 350° C. for times up to 10 years. Salts, such as, for example, brines may be used to increase available cations for reactions. The $CO_2$ reacts with materials within the retort to form soluble bicarbonates and insoluble carbonates, step 112. The retort containing the depleted oil shale is cooled to its native temperature, step 114, sequestering carbon dioxide as soluble bicarbonates and insoluble carbonates for geologic time.

Different embodiments or variations of the process involve injection of different fluids in order to tailor the desired sequestration reactions. The injected fluids in different variations include $CO_2$ and water, $CO_2$ and brines, and $CO_2$ plus $O_2$ with water or brines.

As an illustrative example, which is not meant to limit the scope of the present application, sequestration of carbon dioxide is promoted in an illite-rich oil shale, that is an oil shale deposit containing greater than 10 wt % illite, such as the shale of the Garden Gulch member of the Green River formation in Colorado. Illite-rich shales are believed to be particularly effective at mineralizing $CO_2$. The mineralization process may be further enhanced, if necessary, by injection of additional cations, which may be provided in a brine as described above.

Figure 2:
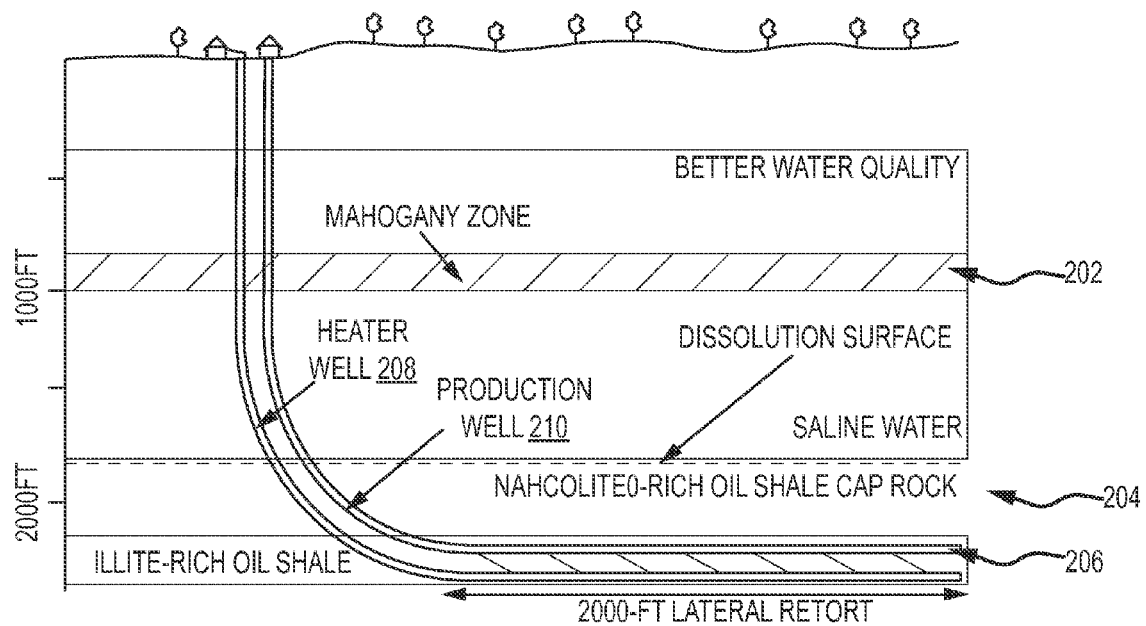
FIG. 2 is a schematic of an oil-shale rich site in Colorado's Green River Formation.

FIG. 2 is an elevation view of an oil-shale rich site 200 in Colorado known as the Green River Formation. FIG. 2 is an exemplary, non-limiting illustration. Some of the layers shown in the elevation view include, at increasing depth, a Mahogany Zone 202, a Nahcolite-rich Oil Shale Cap Rock Layer 204, and an Wife-rich Oil Shale Zone 206. The distances shown are approximate and give a rough idea of the geology of the formation. The region above the Mahogany Zone 202 typically has good water quality. The salinity of the water increases as the Nahcolite-rich Oil Shale Cap Rock Layer 204 is approached. The Illite-rich Oil Shale Zone 206 has a low permeability.

One exemplary process to extract kerogen, in situ, includes heating the Illite-rich Oil Shale Zone 206 to the pyrolysis temperature. Heat may be provided by a heat source via a heater well 208. Fluid kerogen may be removed via a production well 210. In-situ extraction is further described in co-pending U.S. patent application Ser. No. 11/655,152, titled in-Situ Method and System for Extraction of Oil From Shale, filed Jan. 19, 2007, incorporated herein by reference as if set out in full. As can be seen, both the heater well 208 and the production well 210 have a section extending in the Illite-Rich oil Shale Zone 206. While shown as a horizontal well section, the wells may be horizontal, vertical, or any angle therebetween.

In one embodiment, the heater well 208 may include a counter-flow heat exchanger to preheat combustible gases (not specifically shown), which are then combusted to generate heat in the Mite-Rich Oil Shale Zone 206. In another embodiment, the heater well 208 may include a down-hole burner within the Illite-Rich Oil Shale Zone 206. The heater well 208 provides heat for pyrolyzing the shale such that the kerogen is converted to fluids that can be extracted through the production well 210. The combustible gases supplied in the heater well may in various embodiments, including a mixture rich in oxygen and/or containing carbon dioxide, be recovered on the surface from the production well 210 or the heater well 208.

Figure 3:
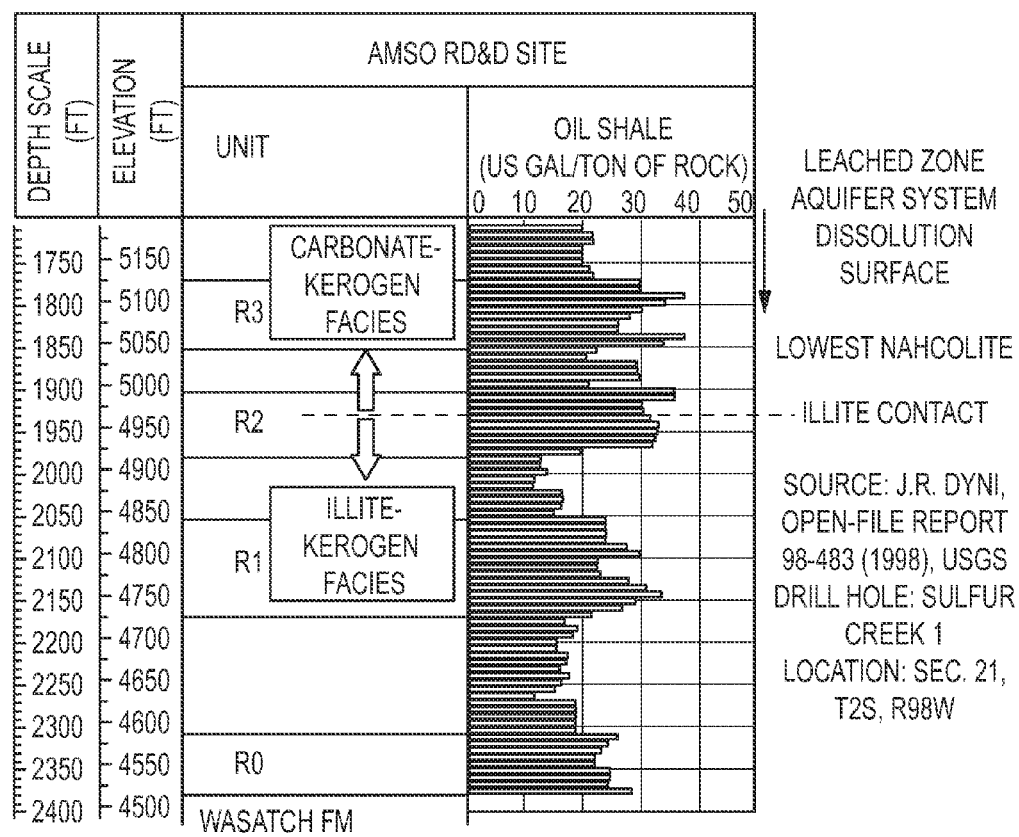
FIG. 3 illustrates that the illite-rich shale contains a substantial amount of kerogen, the organic matter that generates shale oil.

Referring now to FIG. 3, measurements from the exemplary Green River Formation shown in FIG. 2 it can be seen that the Illite-Rich Oil Shale Zone 206 contains a substantial amount of kerogen.

A primary difference between the Illite-Rich Oil Shale Zone 206 and the layers above it is that initial carbonate concentration is lower—mineral $CO_2$ drops from about 15 wt % to about 10 wt %. Correspondingly, silica content rises from 30 to 40 wt %, alumina content increases from 6 wt % to 12 wt %, and soda content drops from 3 wt % to 1 wt %, potassium oxide content increases slightly, magnesia content remains roughly constant at 5 wt %, calcium oxide content decreases from about 8 wt % to 4 wt %, and iron oxide content remains roughly constant at 4 wt %. Because much of the cation content in the upper formation is already tied up as carbonate minerals, primarily calcite, dolomite, there are more cations available for forming solid carbonate minerals in the Illite-Rich Oil Shale Zone 206. Potential carbonate materials that could be formed include dawsonite, nahcolite, calcite, and dolomite, ankerite, magnesite, ferroan magnesite, and siderite. Carbonate minerals could be formed either with or without liquid water.

The natural carbonate minerals in the oil shale may enhance sequestration by reacting with injected carbon dioxide and water to form soluble bicarbonates. This enhancement, is particularly useful in geological formations in which the water is not potentially useable for agriculture or human consumption.

During the in situ extraction of shale oil, carbon dioxide is generated from creating process heat and from pyrolysis of the kerogen in the shale. The heat capacities of illite-rich shale and marlstones are similar, which means that a similar amount of process heat needs to be generated from fuel, for example, by burning natural gas. Also, illite-rich shale has been found to generate a comparable amount of $CO_2$ from pyrolysis as produced from the pyrolysis of typical marlstone.

The amount of $CO_2$ generated from shale oil recovery can be reduced by improving the thermal efficiency of the process. The energy requirement depends on the water content and process efficiencies. Thus, for example, in sine processing of 27 gal per ton of oil shale requires ~1 GJ/bbl (assuming 5 wt % water and 75% Fischer Assay recovered yield by volume). The recovered shale oil has an energy content of 6 GJ/bbl (6:1 gain) (For comparison, electricity with 50% conversion efficiency gives 3:1 gain).

The amount of $CO_2$ generated per barrel of oil produced depends on how the heat is delivered. Natural gas, for example, generates about 55 kg $CO_2$/GJ thermal, or 55 kg/in situ bbl. Pyrolysis of oil shale generates 15 kg $CO_2$ per in situ bbl. Assuming heat losses and heat recapture cancel, the shale may generate 70 kg $CO_2$/in situ bbl, or 3.2 gCeq/MJ shale oil. With refining and transportation losses, the final fuel value is ~6

Even a finely tuned shale oil recovery process will generate some $CO_2$. There is sufficient porosity generated during retorting to store the $CO_2$ formed during heat-generation operations. In addition to $CO_2$ generated locally, $CO_2$ could be sequestered from neighboring combustion and gas production operations or other sources.

Given favorable thermodynamic conditions, the porosity generated during pyrolysis can promote reactions to store $CO_2$ generated from making process heat. The $CO_2$ may be pumped, for example, into the heater well, it is estimated that about 35 kg $CO_2$ is generated per ton of oil shale processed. If this $CO_2$ were converted to calcite, it would constitute about 9 wt % of the retorted shale. This indicates that there should be sufficient material and volume to sequester at least the $CO_2$ produced during oil shale recovery.

In one embodiment, during or just after pyrolysis, $CO_2$ is pumped to the heated region as described by step 108 above. The injected or pumped $CO_2$ reacts with material in the retort to mineralize. As an example of the available porosity, kerogen (the main organic compound in oil shale) comprises about one third of the illite-rich oil shale volume, and pyrolysis removes approximately two thirds of the organic matter. The density of the remaining char is higher due to lower hydrogen content, but the char is microporous. Depending on the exact sample, approximately 30% of the porosity is available for storing $CO_2$. Compaction might reduce porosity to ~20%, with carbonate mineralization occupying, about one third of the available porosity.

In addition to mineralization of the $CO_2$ by reaction with illite, other non carbonate materials remaining in the shale deposit may be available to supply sodium, potassium, magnesium, calcium, or iron to mineralization reactions. These other materials include, but are not limited to other clays (e.g., muscovite, chlorite, or kaolinite), feldspars, analcime, iron sulfides, and apatite.

As identified in FIG. 1, the $CO_2$ is injected to the retort subsequent to extraction, step 106. Providing the $CO_2$ just after pyrolysis uses the residual heat in the ground to facilitate the mineralization reactions. For example, the carbon dioxide and the illite may react at temperatures between 150° C. and 300° C. Preferably, the reaction occurs be ten about 200° C. and 250° C. In yet another embodiment, the temperature for mineralization reactions is approximately 225° C.

Alternatively, the $CO_2$ may be injected at step 106 shortly after pyrolysis. The $CO_2$ may be injected at step 106 along with water or brine when the depleted retort temperature is hot enough that the initial temperature after injection is hot enough to form metastable minerals. The metastable minerals may subsequently react with $CO_2$ during cool down to form carbonate minerals, such a dawsonite, between 150 and 100° C., or more preferably, between 130 and 120° C.

Alternatively, the $CO_2$ may be injected in step 106 shortly after pyrolysis with enough water to quickly cool the depleted oil shale retort to below 150° C., or to below 130° C., depending upon the $CO_2$ pressure and pH. The reactions with the oil shale minerals can then form carbonate minerals such as dawsonite without the formation of intermediate metastable minerals.

The temperature of the $CO_2$ can be adjusted by heat exchange or combustion to help achieve the desired temperature in the depleted oil shale retort.

Oxygen may be added to react with underground minerals to increase or maintain the temperature to promote mineralization reactions. Thus, for example and without limitation, oxygen may oxidize with residual char from pyrolysis and/or iron sulfides to increase the temperature underground.

Ammonia or alkaline hydroxide may be added to modify the pH to between 6 and 7, or between 7 and 8, or to above 8, to increase the rate of illite dissolution.

Ammonia or alkaline hydroxide may be added to modify the pH to above 5, or between 6 and 7, to reach the thermodynamic stability field of dawsonite.

Figure 6:
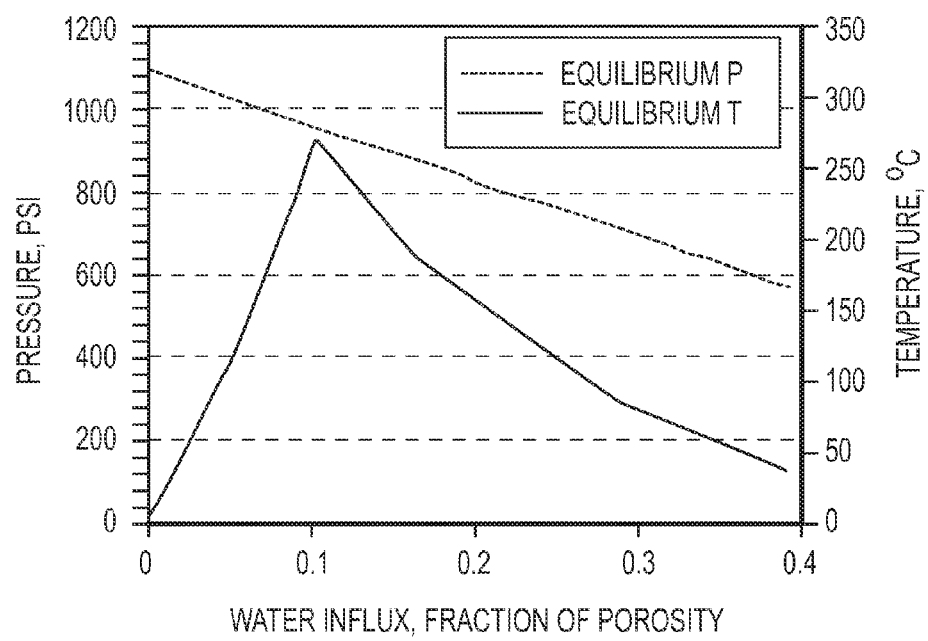
FIG. 6 illustrates temperature of the depleted oil shale retort as it is filled with water.

As shown by FIG. 6, filling the retort with water decreases its temperature, which increases the thermodynamics driving carbonate formation but decreases the chemical reaction rates forming carbonates. The temperature and steam pressure as a function of the fraction of pore volume filled with water is shown in FIG. 6, Approximately half the void can be filled with water before the temperature chops below 150° C., depending on the initial temperature of the spent shale. Higher temperatures can be obtained at higher fill fractions by preheating the water prior to injection or by adding oxygen to the injected fluids to oxidize the iron sulfide to iron sulfate.

As indicated above, the $CO_2$ may be provided with brine to provide additional cations for mineralization, injecting the $CO_2$ with brie reduces the temperature of the retort. Once the retort reaches a temperature between 150° C. and 100° C., such as, for example, 150° C., 130° C., or 120° C., that temperature is maintained for a few years by injecting in small levels of oxygen in order to oxidize sulfide minerals.

$CO_2$ may be stored as bicarbonate by dissolution of dolomite and calcite. Because the illitic shale is, in a preferred embodiment, hydrologically isolated from protected waters and contains very saline water to start with (which in some cases may be approximately the same as sea water), dissolved solids do not pose an environmental problem. This may not be the case for oil shale higher in the formation that may or may not be isolated from protected waters.

$CO_2$ reacts in multiple ways with material in the retort to mineralize the $CO_2$. For example, the $CO_2$ reacts with carbonate Minerals in the retort to form bicarbonate minerals either in solution or as solid minerals. For example and without limitation, $2CO_2 + dolomite + 2H_2O = Ca^{+2} + Mg^{+2} + 4HCO_3^-$. Ideally, the reaction products are isolated from protected waters by impermeable geologic barriers when dissolved minerals are formed.

In addition to the natural availability of cations for mineralization, the isolation of the illite-rich oil shale front potentially usable water in the leached zone means the saline water can be injected into spent retorts in the illite zones to increase cations available for making carbonate minerals. The saline water could come from oil shale processing operations or from nearby natural gas operations. The brines may be concentrated by distillation, ion exchange, or membrane filtration (reverse osmosis).

An additional source of carbonate minerals is the formation of dawsonite using $Al_2O_3$ from albite and $Al_2O_3$, MgO, and $Fe_2O_3$ from illite $[(K,H_3O)(Al,Mg,Fe)_2(Si,Al)_4O_{10}[(OH)_2,(H_2O)]$ or muscovite $[KAl_2(AlSi_3O_{10})(F,OH)_2]$. The $Al_2O_3$ would be converted to dawsonite $[NaAlCO_3(OH)_2]$, and the MgO and $Fe_2O_3$ would go to magnesite ($MgCO_3$), siderite ($FeCO_3$), or ferroan magnesite (mixed Fe, Mg carbonate). Another net carbonate-mineral-forming reaction results from the iron in FeS and $FeS_2$, reacting to siderite and $H_2S$ or sulfate.

The capturing ability of the shale is related to its grain size, and clay minerals ordinarily have the finest grain size, hence most reactive source of cations. The capturing ability of the shale may be enhanced by the injection of brine (primarily NaCl).

Figure 4:
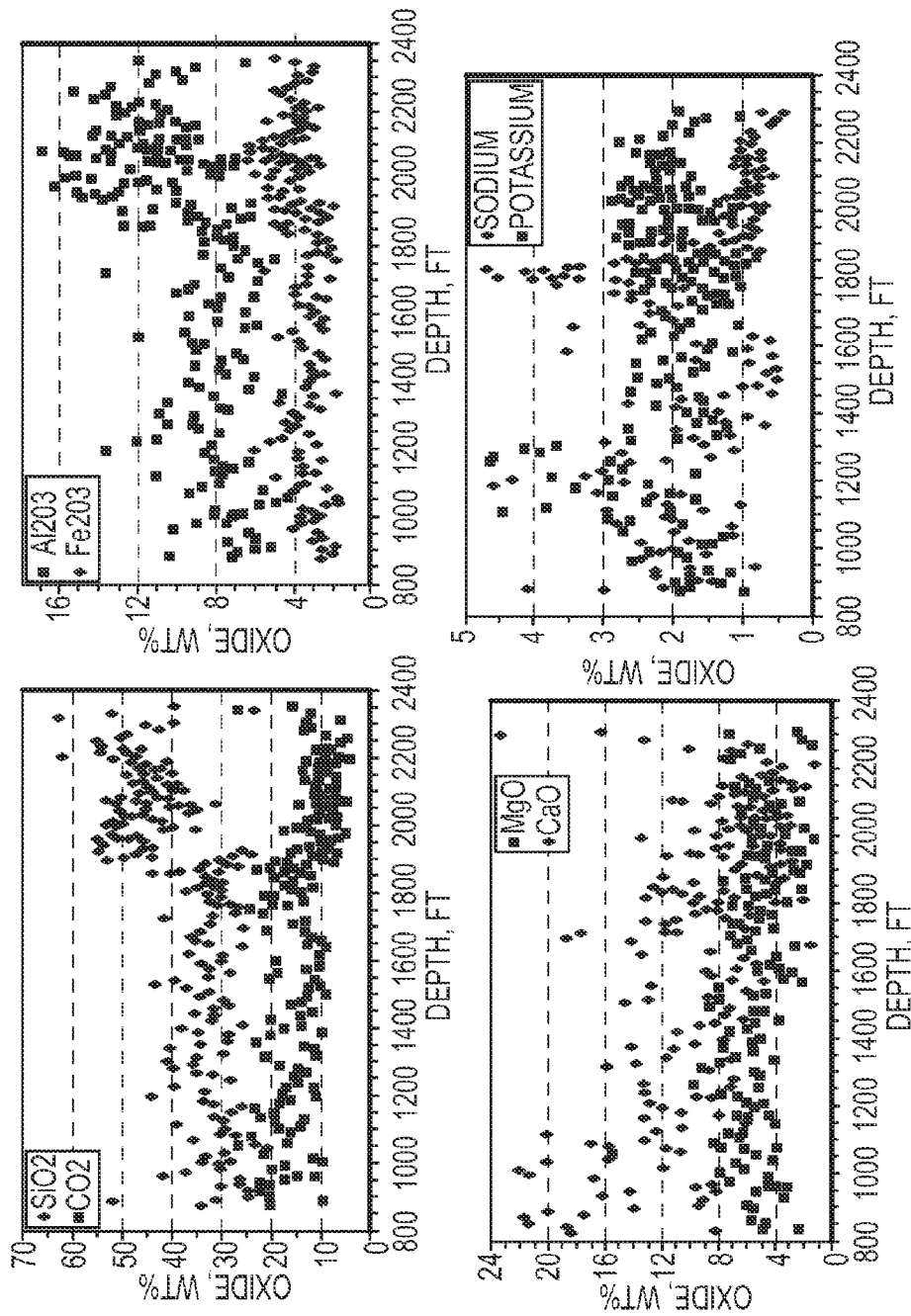
FIG. 4 illustrates the change in oxide content as a function of depth, with 1900-1950 feet being a step change in many elements.
Figure 5:
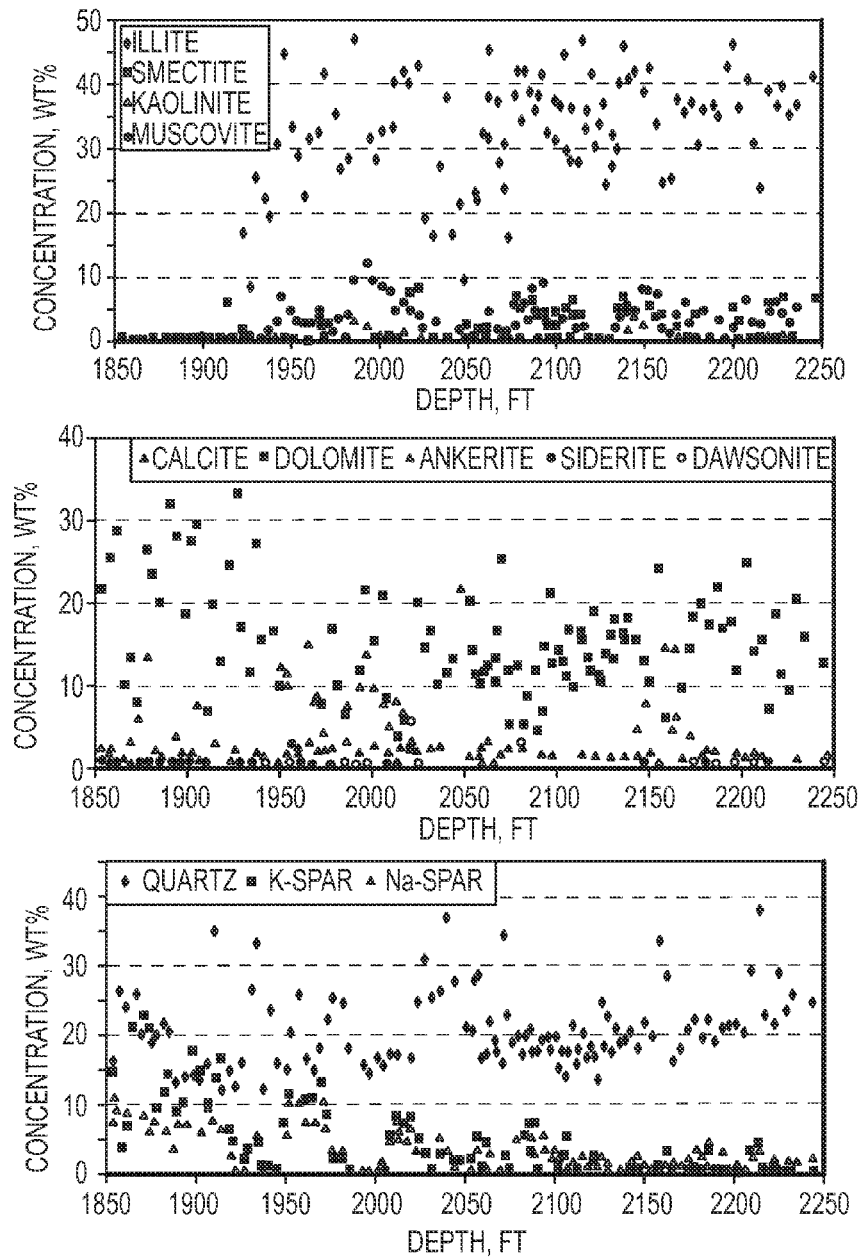
FIG. 5 illustrates the mineral analysis determined by Fourier Transform Infrared Spectroscopy, with 1900-1950 feet being a step change in many minerals.

As shown in FIG. 4, elemental composition of the oil shale minerals changes as a function of depth, which affects the kinds of $CO_2$ mineralization reactions possible. Silica concentration increases and mineral $CO_2$ decreases lumina and $Fe_2O_3$ increase about 50%, while CaO and MgO decrease somewhat, with CaO being a little larger change. $Na_2O$ decreases significantly, and $K_2O$ increases slightly. These trends are consistent with transition to an illite-rich shale. The high $Na_2O$ levels between 1700 and 1950 feet are associated with a Saline zone, not specifically shown.

The minerals present in the =reacted oil shale change with depth. Oil shale minerals above 1700 feet are dominated by dolomite, with sodium and potassium feldspars also in large concentrations, 1700 to 1900 feet interval, saline minerals such as dawsonite become abundant. At greater depths, illite clay becomes the most abundant mineral, comprising about 35% of the rock on average, as shown in FIG. 4. Quartz is the next most abundant mineral, comprising about 20% of the rock, and dolomite comprises about 15% of the rock.
Investigation for Carbonate Mineralization of Spent Oil Shale Geologic sequestration is a possible component to the long-term reduction of $CO_2$ emissions generated from fossil fuels. Therefore, there is interest in ways of mitigating $CO_2$ emissions generated from in-situ oil shale processing.

The strategy exploited by the technology of the present application includes mineralization possibilities after oil is produced from illite-rich oil shale, such as, for example, in the Garden Gulch member of the Green River formation at a depth of about 1950 to 2350 feet (see FIG. 2). In this exemplary formation, the oil shale unit is thought to be hydraulically isolated from overlying drinking water aquifers by adequate cap rocks or the like. At the end of production, the produced zone (a.k.a. depleted oil shale formation) is estimated to be a porous, fractured material at about 350° C. Geochemical reactions between injected $CO_2$, which may be enriched with brine, and the residual material in the formation may sequester $CO_2$ as stable carbonate minerals (dawsonite, dolomite, calcite). This provides the added benefit of reduction of formation porosity and enhances long-term subsidence. The brine may come from waters produced with deep natural gas in the area or from the saline aquifer above the oil shale unit.

The idea of converting the $CO_2$ gas to solid carbonate minerals is particularly appealing, because on a human time scale, this is permanent disposal. Unfortunately, typical mineralization of $CO_2$ is limited by slow reaction kinetics for most saline aquifer systems. Oil shale production zones are different from most saline aquifer systems. One difference includes the fact that the in-situ production of oil shale heats the ground to high temperatures. At higher temperatures, reaction kinetics normally are much faster and consequently the potential to trap $CO_2$ as carbonate minerals is greater. Recent rock-brine-$CO_2$ experiments at 200° C. show that iron and magnesium carbonate minerals readily form within three months of reaction. Similarly, high temperature pretreatment of magnesium silicate minerals react readily with elevated concentrations of dissolved $CO_2$ to form carbonate minerals. The extent of $CO_2$ mineralization should increase at high temperature, because silicate minerals dissolve faster and provide more metals to form the solid carbonate minerals for carbon sequestration.

The largest pool of mineral carbonation from illitic oil shale typically would be the conversion of aluminum in illite to dawsonite and the conversion of iron in pyrrhotite to siderite. Additional sources of mineral carbonation are dissolved calcium and magnesium present in silicate phases.

Figure 7:
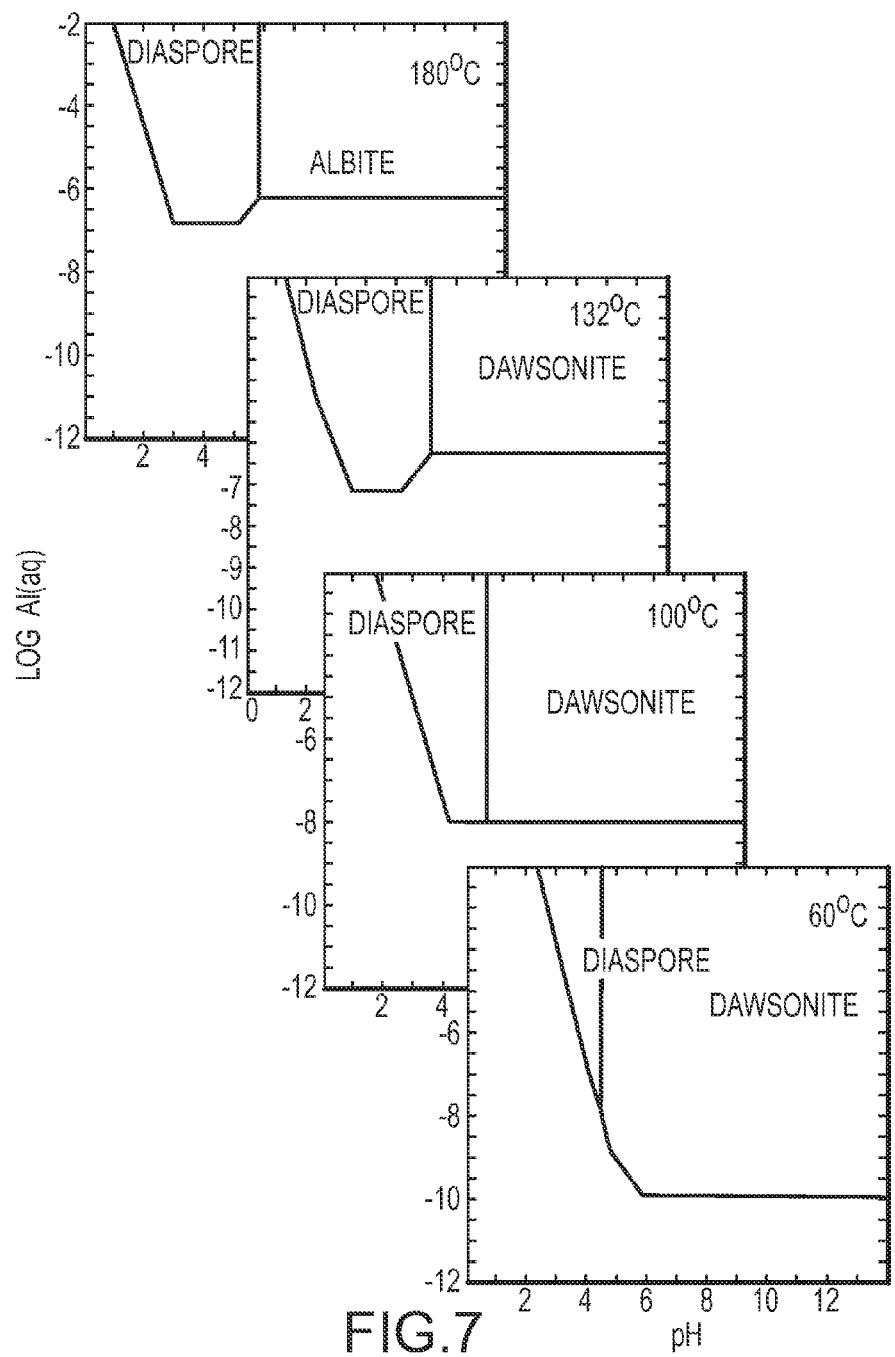
FIG. 7 shows simulations at 180, 132, 100, and 60° C. of the stability of aluminous phases in solution with NaCl=0.4 molal, quartz at its solubility limit, and $CO_2$ fugacity ($f_{CO2}$) equal to 60 bar.
Figure 8:
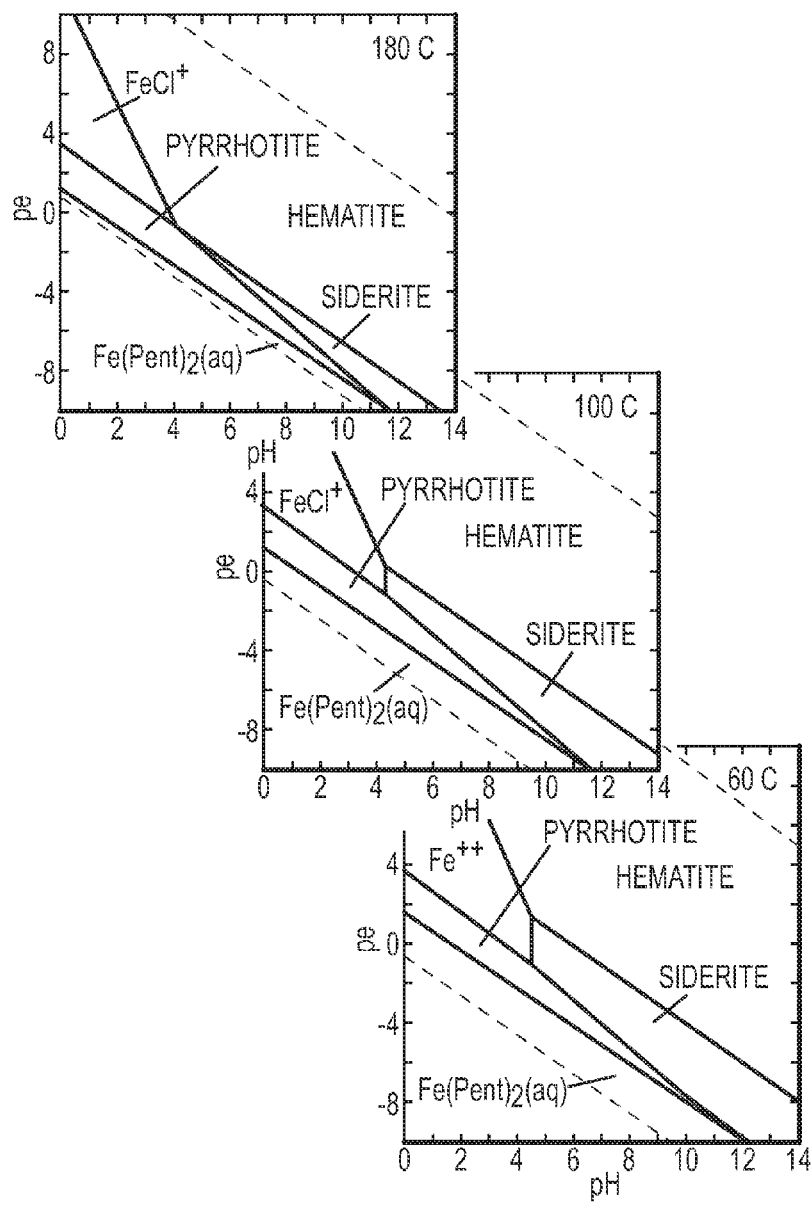
FIG. 8 shows simulations at 180, 100, and 60° C. of the stability of iron phases as a function of pe and pH in solutions with [NaCl]=0.1 molal, [$FeSO_4$]=$2 \times 10^{-4}$ molal, quartz at its solubility limit, and $CO_2$ fugacity of 60 bar.

FIGS. 7 and 8 summarize the aluminum and iron geochemistry at 60, 100, 180° C. in activity diagrams. The stability of aluminum and iron carbonate phases tends to increase with decreasing temperature, increasing pH, increasing $CO_2$ pressure, and in the case of iron carbonates with more reducing environments. Thus, the extent of mineral carbonation of the depleted oil shale with brines saturated with elevated $CO_2$ concentrations largely depends on the relationship between depleted oil shale cooling rates, depleted oil shale dissolution rates, secondary carbonate and oxyhydroxide precipitation rates, and the stability of the oxyhydroxides formed at higher temperature as the spent shale cools. The temperature boundary between dawsonite and albite stability fields increases as $CO_2$ pressure increases, so increasing $CO_2$ pressure enables the mineralization process to access faster reaction rates, for example, from 126 to 136° C. as $CO_2$ pressure increases from 40 bars to 100 bars.

The technology of the present application was laboratory tested in one exemplary study. The objective of this study was to assess rate of conversion of carbon dioxide gas to carbonate minerals when reacted with residual oil shale after organic material has been extracted through thermal in-situ processes, in the first phase of this study two types of experiments were conducted. Key metal ion release rates the potential carbonate mineralization were measured by reacting spent oil shale at 140, 160, and 180° C. from pH 2 to 7 in mixed flow-through reactors. The extent of mineral carbonation was measured in a batch experiment 160 to 100° C. temperature gradient by reacting $CO_2$, spent shale, and brine.

The spent oil shale used in all experiments was a blend of discrete intervals of illite-rich oil shale that produced medium amount of oil from crushed material (<3 mm) when assayed by the Fischer method. The Fischer method is generally understood in the art and will not be explained herein except to the extent it is required for a complete understanding of the technology of the present application. Powder x-ray diffraction shows that the spent oil shale blend consisted of quartz, illite, dolomite and detectable amounts of albite and pyrrhotite. The detection of pyrrhotite supports the conclusion that the near 1:1 correlation between Fe and S represents the conversion of pyrite ($FeS_2$) to pyrrhotite ($Fe_7S_8$) during retorting.

The spent shale was reacted in 0.4 molal NaCl brine, because a more complex reservoir brine might mask relevant geochemical reactions. The NaCl brine was synthesized from Omnipure NaCl salt. Brines were acidified using high purity HQ for dissolution experiments. High purity liquid $CO_2$ was pressurized at temperature and pressure to generate supercritical $CO_2$ for the batch experiments.

The spent shale was reacted with 0.4 molal NaCl brine from pH 2 to 7 at 140, 160, 180° C. in a titanium mixed flow reactor to determine the net dissolution rates for metals that could from carbonate minerals in the presence of carbon dioxide. At given temperature, the effect of pH was conducted in a series of stacked experiments, in which input solutions of different pH were reacted sequentially on the same spent shale fraction. Carbonate minerals present in the spent shale tended to buffer the reaction at pH 7 and also masked the release of calcium and magnesium from silicate dissolution. For these reasons, the spent shale was reacted at pH 2 to remove all carbonate minerals from the spent shale, followed by reaction with pH 3 to 5 solutions to mimic the acidity associated with brines equilibrated with supercritical $CO_2$ at the experimental conditions. Net rates of spent shale dissolution were calculated from the change in the input and output concentrations at steady-state (when the concentrations are constant with time).

Prior to the experiment, the reactor was acid cleaned and passivated at 400° C. to create an unreactive $TiO_2$ layer on the vessel walls. After loading about 4 grams of spent shale into the reactor, it was sealed, air was evacuated from the reactor system, the reactor was filled with acified 0.4 molal NaCl brine, and finally the temperature and pressure were increased to run conditions (140 to 180° C. and 1000 to 1200 psi).

The experiments used pH 3.0 and 5.0 solutions acidified with high purity HCl as proxies for acidity that is generated in brines equilibrated with supercritical $CO_2$. This was done because the effect of $CO_2$ on mineral reaction kinetics is due to acidity associated with carbonic acid solubility in solutions equilibrated with supercritical $CO_2$. The $CO_2$ itself has no direct effect on dissolution of alumino silicate minerals.

Major and trace metals in the samples and the stock solution were analyzed using inductively coupled plasma mass spectrometry (ICP-MS). Samples were prepared volumetrically with a 20:1 dilution using an internal standard solution in 2% nitric acid. A fully quantitative analysis using a linear calibration curve based on known standards was performed. The internal standard corrected for instrument drift and suppression from the sodium chloride matrix. As and Si were run in CCT (Collision Cell Technology) mode due to polyatomic interferences. A Minimum Detection Limit (MDL) was established using 7 separate preparations and serial dilution, duplicate samples, and matrix spike samples were analyzed for quality control. The results were corrected back through the dilutions to the original sample and reported as ng/g (ppb).

Ion chromatograph was used to analyze for $Na^+$, $K^+$, $Cl^-$, $SO_4^{2-}$. Sodium and chloride showed no net change from the input solution, and potassium concentrations were below the detection limit once diluted for the background electrolyte.

Total inorganic carbon (TIC) concentrations are determined using an automated OI Analytical Aurora 1030W Carbon Analyzer and model 1088 rotary autosampler. The Aurora 1030W uses a syringe pump to transfer samples and reagents to a temperature-controlled reaction chamber. TIC samples are reacted with 5% phosphoric acid to evolve $CO_2$ gas, which is purged by a stream at $N_2$ gas and quantified using a NDIR detector. All pH measurements were made at room temperature calibrated against pH 4.01 and 7.00 buffers.

The aqueous geochemistry was modeled thermodynamically for sulfide, carbonate, oxide/hydroxide, and silicate saturation with the Geochemist's Workbench geochemical codes and the thermo.com.v8.r6+ database developed at Lawrence Livermore National Laboratory. Activity coefficients were calculated from the extended Debye-Huckel method, which is valid to ionic strengths of about 3 mol $kg^{-1}$. The Debye-Huckel method is generally understood in the art and will not be explained herein except to the extent it is required for a complete understanding of the technology of the present application.

Figure 9:
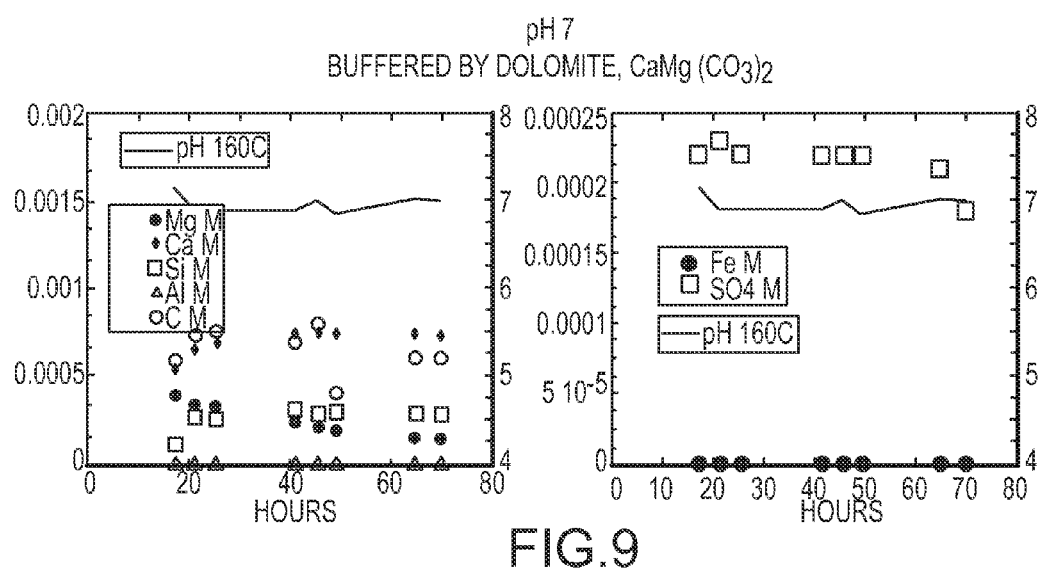
FIG. 9 shows an example of selected ion reaction rates as a function of time for the effluent of 0.4 molal NaCl passed over depleted illite-rich oil shale at a temperature of 160° C.

Depleted oil shale dissolution rates were determined at 140, 160 and 180° C. to measure the release rates of metals that could react with $CO_2$-rich waters to from carbonate minerals as the spent oil shale reservoir cooled. Results from an exemplary dissolution experiment are shown as ion release rates as a function of time in FIG. 9. The calculated dissolution rate for an element M represents the net dissolution and precipitation of all minerals in the spent shale that contain element M. At each temperature, dissolution rates were measured by changing the solution pH without removing the spent shale. Spent shale was replaced when the temperature was changed.

Figure 10:
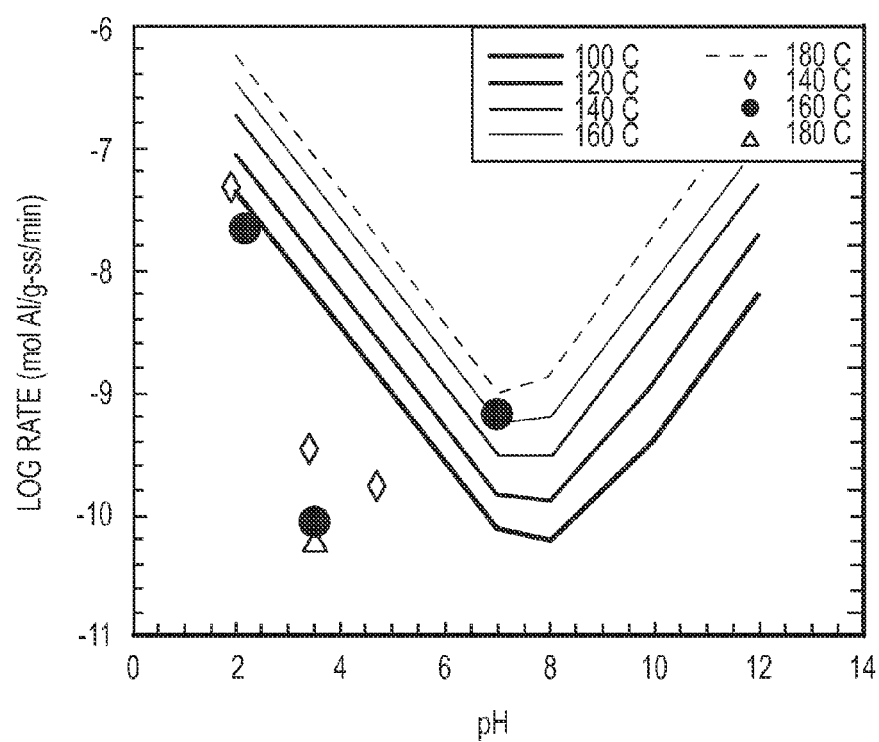
FIG. 10 shows a comparison of illite dissolution rates from the depleted oil shale with illite dissolution rates extrapolated from data obtained from 5 to 50° C.

FIG. 10 shows, for example, of the dissolution rate of aluminum as a function of and temperature. The results determined in this study compare favorably to an extrapolation of the results of Kohler et al., 2003, except at pH values from 3 to 5. This is because of the apparent dissolution rate of the illite from the depleted oil shale reflects not only the dissolution of illite but also the precipitation of a solid aluminum form such as diaspore.

The Al dissolution rate data can be used to estimate the time for illite dissolution of illite. Complete illite dissolution and the dissolution of any secondary aluminum oxyhydroxides ranges from 10 to 100 years depending on the temperature and pH. At, for example, pH 7 and a temperature of 160° C., about 8 years are required for complete illite dissolution. Stability diagrams suggest that direct conversion of Al dissolved from illite to dawsonite will occur at temperatures below 132° C. and pH above 6 for $CO_2$ fugacity of 60 bar, where secondary aluminum oxyhydroxides are not stable. The illite-rich oil shale, less than half the illite must dissolve to supply enough alumina to store all the $CO_2$ generated during kerogen extraction as dawsonite, so the reaction rate could be as short as 4 years.

Figure 11:
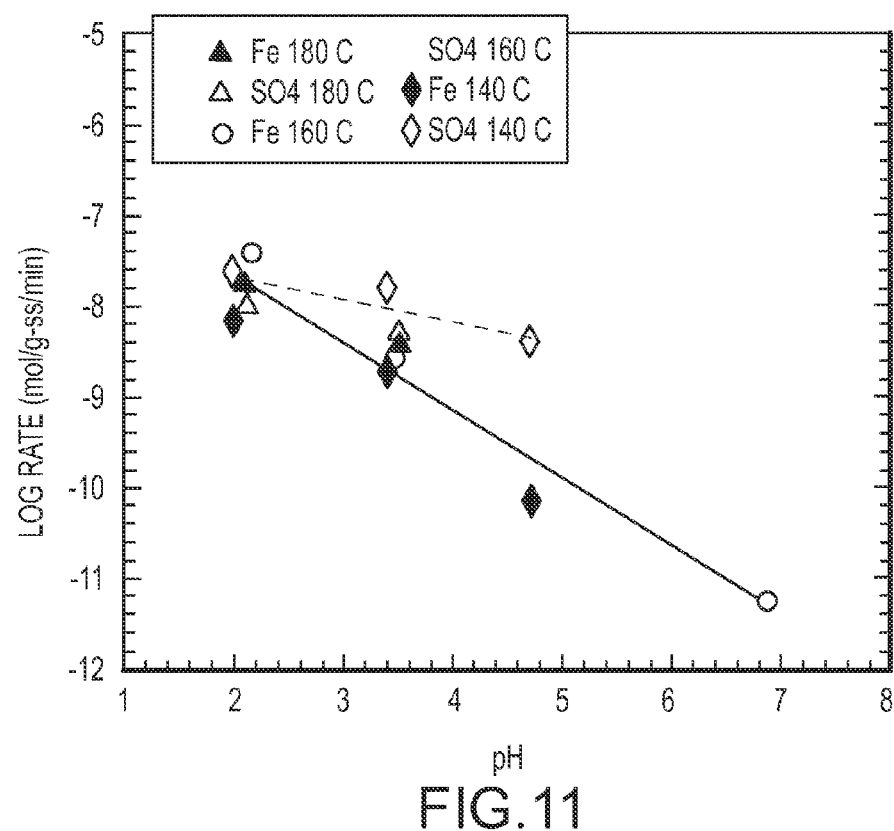
FIG. 11 shows the release rates of iron and sulfate ions from depleted shale at 140, 160, and 180° C. from pH 2 to 7.

Times needed to mineralize the Fe found in pyrrhotite as siderite were estimated using the $SO_4$ rate data shown in FIG. 11. The calculations suggest that in an oxidizing environment, iron sulfides readily dissolve within a fey months at elevated temperatures and are a source of $CO_2$ mineralization within a given redox window. Thus the redox environment would need to be oxidizing enough to dissolve pyrrhotite and reducing enough to precipitate as $Fe^{2+}$ carbonate and not $Fe^{3+}$ oxide.

The extent of mineral carbonation of the processed oil shale with brines saturated with elevated $CO_2$ concentrations largely depends on the relationship between spent shale cooling rates, spent shale dissolution rates, secondary carbonate and oxyhydroxide/oxide precipitation, rates, the pH, and the stability of the oxyhydroxide/oxides formed at higher temperature as the spent shale cools. The geochemical calculations and experiments reported here indicate that temperatures below 150° C., depending upon the $CO_2$ fugacity and mineral to be formed, are preferred for geologic sequestration of $CO_2$ as carbonate minerals from aqueous solution. At lower temperatures (130° C.) and near neutral solutions, carbonate mineral stability increases. This should increase the likelihood of directly converting the dissolved iron sulfides and illite to iron and aluminum carbonates.

Illite and pyrrhotite are the two main sources for mineralization of $CO_2$ emissions generated from in-situ oil shale processing, where the mole ratio of stored $CO_2$ for illite to pyrrhotite is out 5:1. Although illite is more abundant, faster pyrrhotite reaction kinetics make it a viable candidate for $CO_2$ mineralization. An example for successful mineralization of $CO_2$ could entail allowing the processed shale to cool to 130° C., controlling redox environment by injection of oxygen to promote pyrrhotite dissolution and siderite precipitation, followed by long-term injection of oxygen to maintain 130° C. and to promote illite dissolution and dawsonite precipitation.

Carbonate formation is also favored by increasing the pH closer to neutral than normally occurs for waters in equilibrium $CO_2$ fugacities above 40 bar. This can be accomplished by adding ammonia, for example, recovered from the gas generated during retorting, or an alkaline hydroxide, such as for example, sodium hydroxide, which would form a bicarbonate buffer solution. Unreacted ammonia and sodium bicarbonate could be recovered at the end of the mineralization reactions by pressure reduction, brine purging, or both.

Evidence for Carbon Sequestration in Retorted Oil Shale

Figure 12:
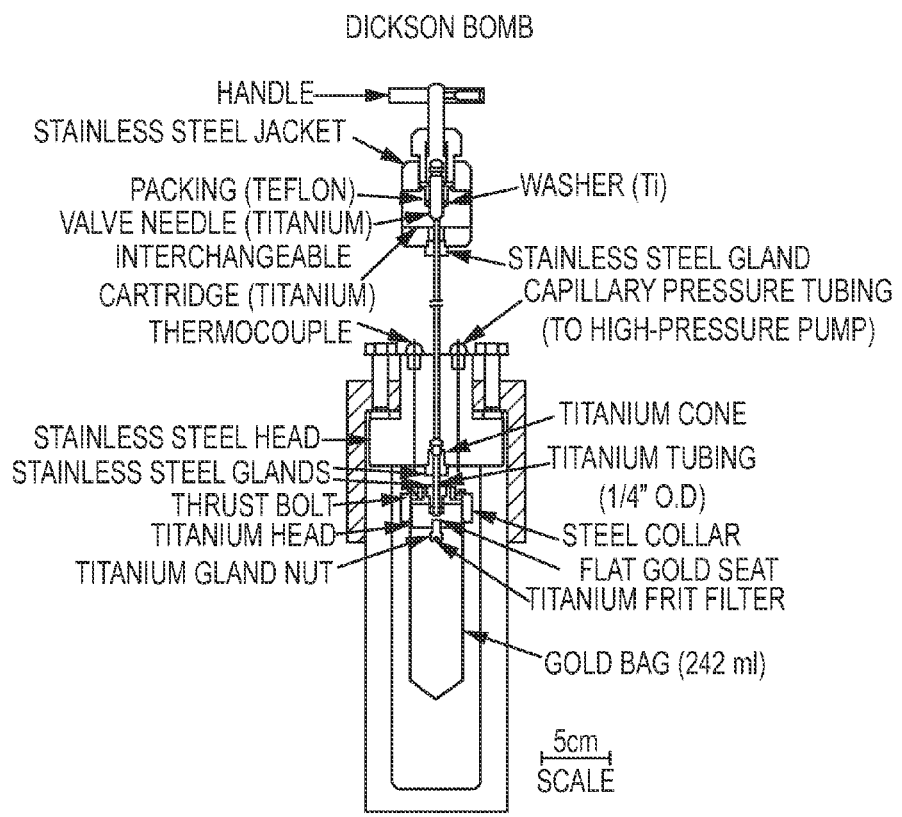
FIG. 12 illustrates an exemplary test device generally known as a Dickson Bomb.

A sequestration experiment was conducted in a "Dickson Bomb", which contained retorted shale inside a gold bag. The experimental device is shown in FIG. 12. In the experiment, 0.4 molal NaCl, and supercritical $CO_2$ to directly measure the conversion of spent shale and carbon dioxide to carbonate minerals. Changes in solution composition were from reaction of the spent shale with $CO_2$ charged solution because reactants contact only go or passivated titanium. For this experiment, about 100 g of spent shale were reacted with 200 g of 0.4 in NaCl at 160° C. and 870 psi (60 bar) for 7 days, a sample was taken, and then liquid $CO_2$ was loaded into the vessel. As cooled liquid $CO_2$ is pumped into the vessel it transforms from its liquid state to its supercritical state at run temperature and pressure. About 1.3 g of supercritical $CO_2$ were added to the reaction vessel to allow for sufficient mineral carbonation based on the results of the kinetic experiments. In an effort to mimic cooling of the spent shale over time, temperature was decreased from 160 to 100° C. at a rate of 10° C. per week. These experiments allow the carbonate mineralization and the approach to equilibrium to be assessed as a function of time in a multi-phase experiment by sampling the solution as a function of time.

At the end of the experiment, the initial and reacted shale samples were characterized by x-ray diffraction, thermogravimetric analysis, and differential scanning calorimetry. All three methods detected the formation of ferroan magnesite, which means that some of the magnesium ions in the magnesium carbonate have been replaced with iron(II). There was a net increase of 0.8 wt % $CO_2$ stored in carbonate minerals in the rock, which corresponds to an additional mineral content of about 1.5 wt %.

Figure 13:
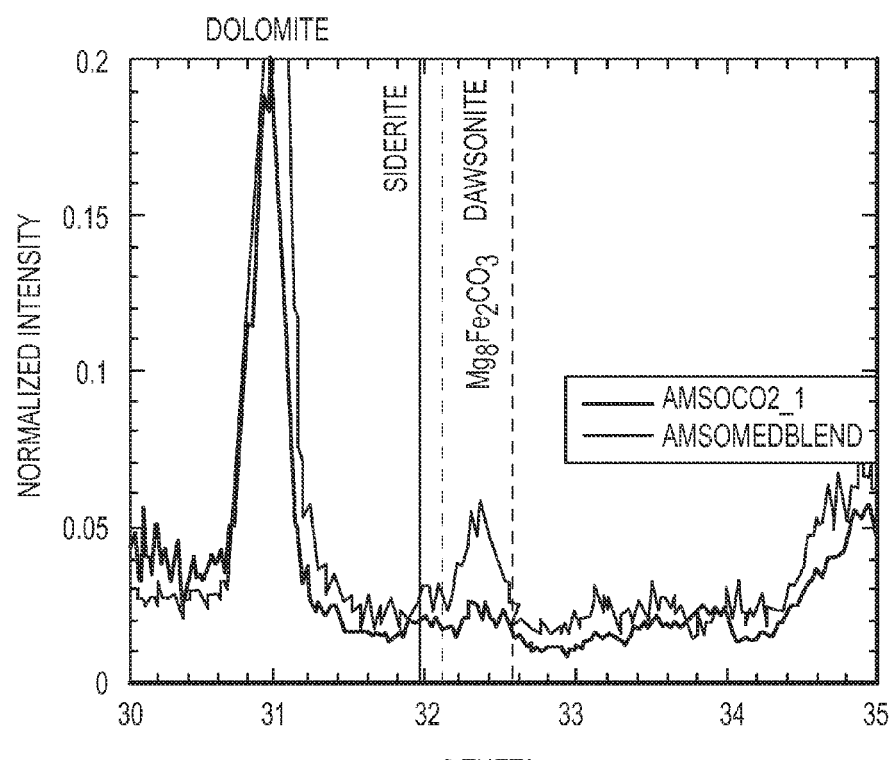
FIG. 13 shows an exemplary x-ray diffraction spectrum.

FIG. 13 shows x-ray diffraction evidence for the formation of ferroan magnesite ($Mg_{0.8}Fe_{0.2}CO_3$). The solid solution would be expected to have a diffraction peak between siderite and magnesite, and a peak has grown in that area.

Figure 14:
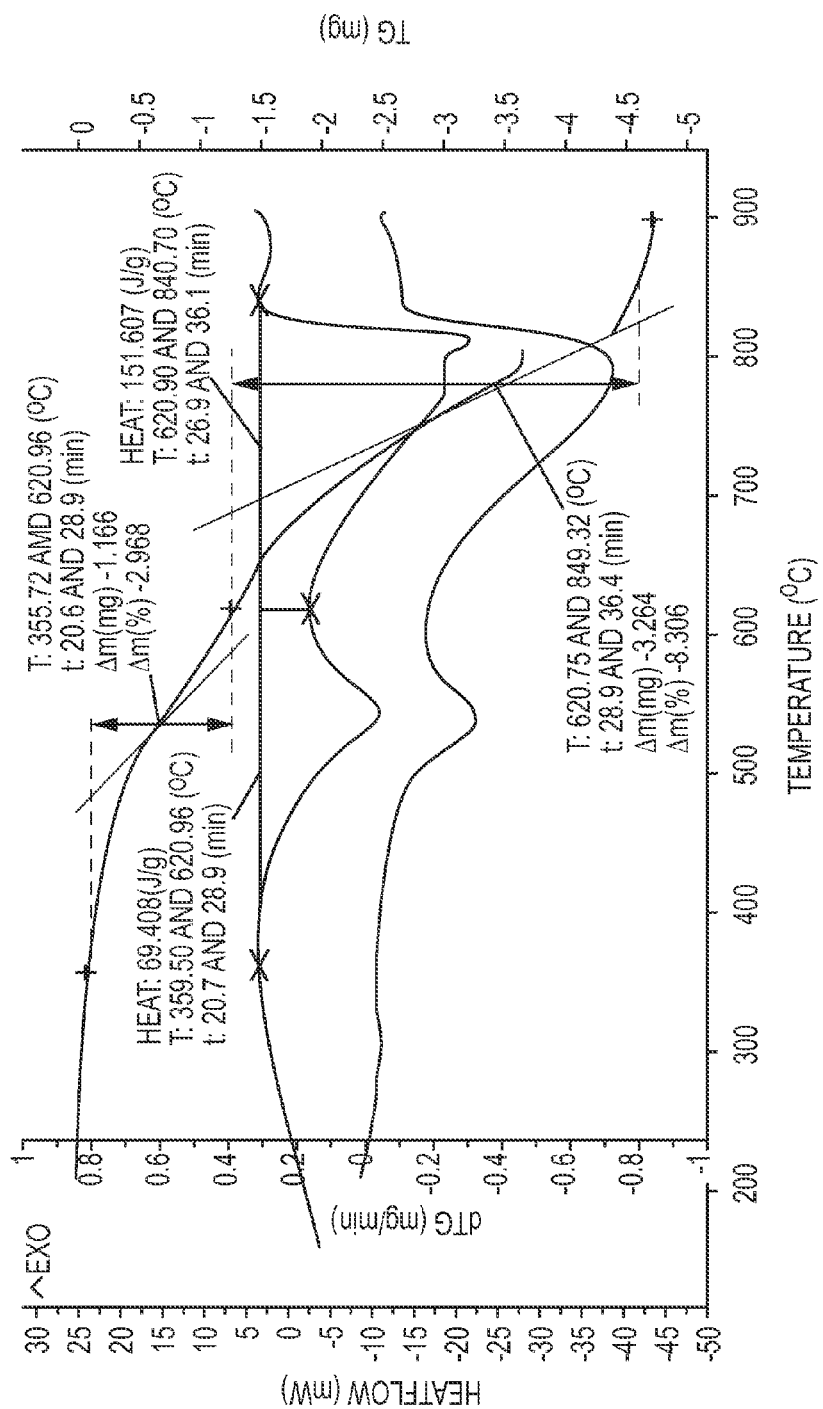
FIGS. 14 and 15 show a sample before and after thermogravimetric analysis.
Figure 15:
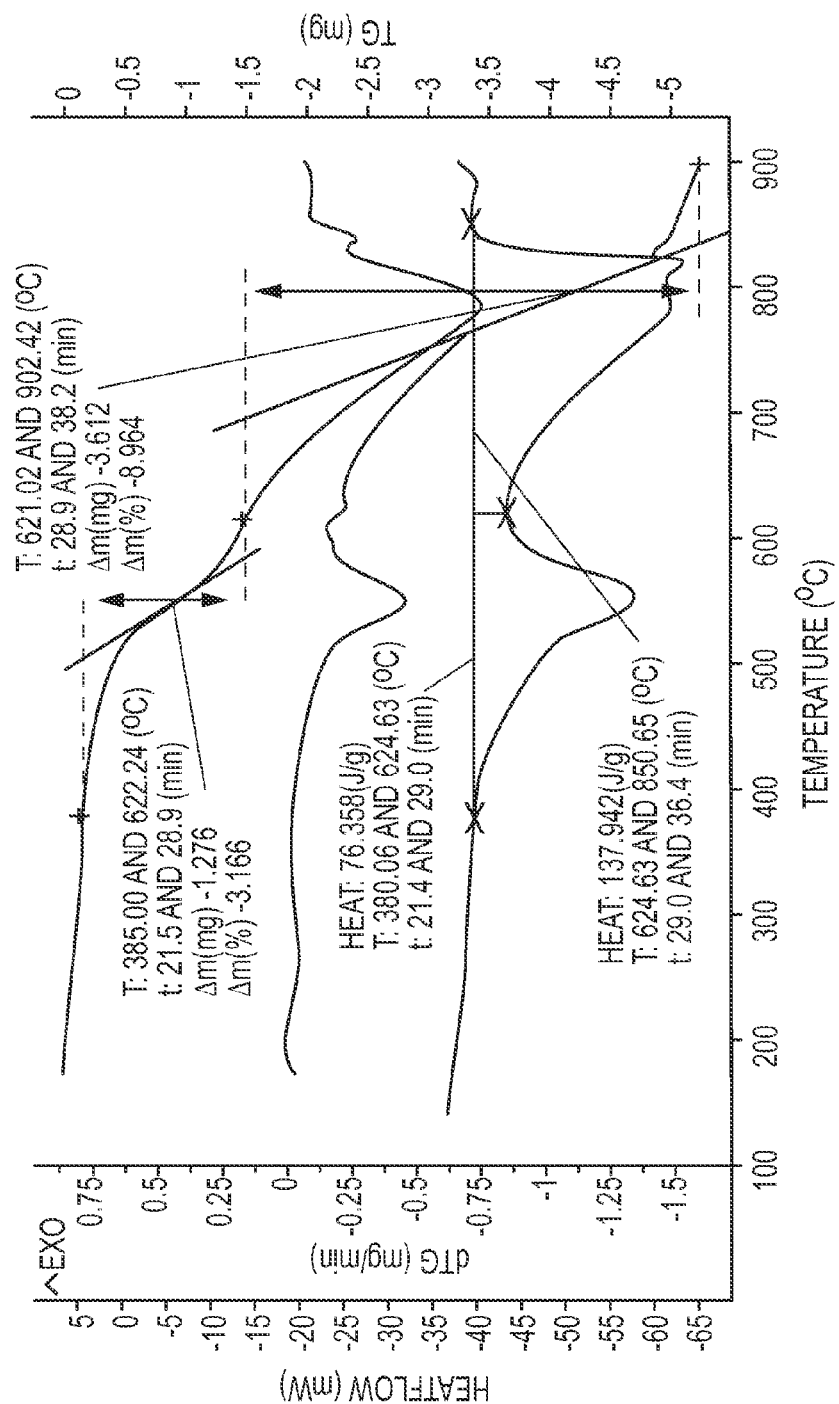

FIGS. 14 and 15 show thermal analysis evidence for the formation of ferroan magnesite. The thermal analysis technique simultaneously measures weight loss (thermogravimetric analysis) and heat flow (differential scanning calorimetry) due to chemical reactions. The negative peak at 540° C. in the retorted shale is due to dehydration of illite. After reaction with $CO_2$, a new negative peak appears at 560° C., which is about the temperature expected for ferroan magnesite. The original illite signal appears as a low-temperature shoulder on the new peak.

Figure 16:
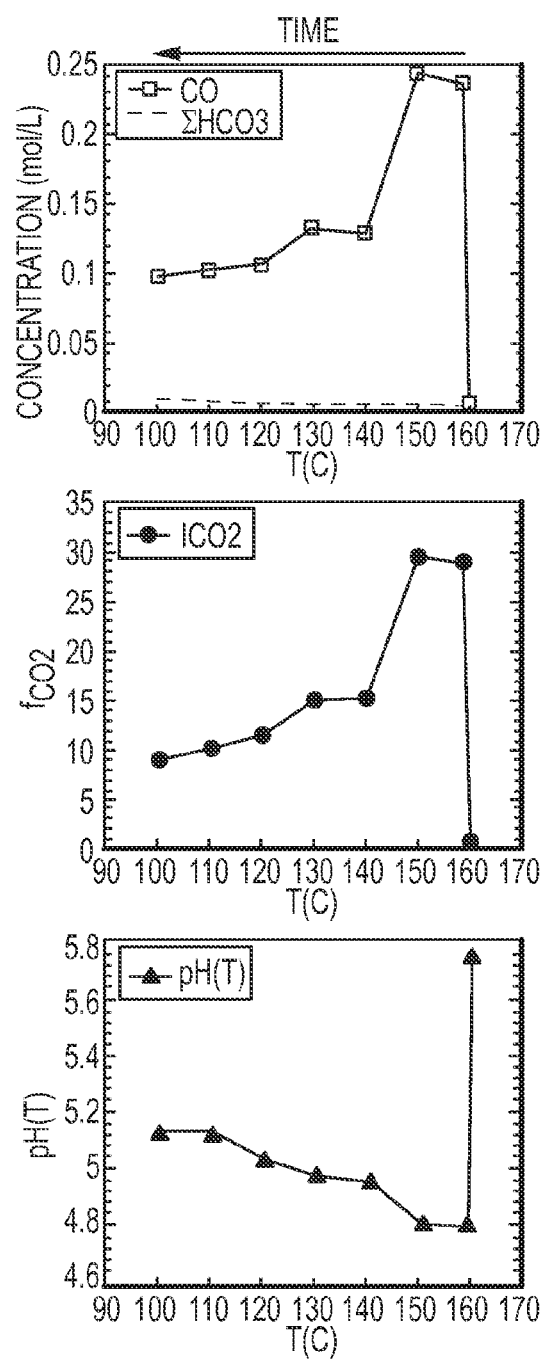
FIG. 16 shows changes in was and solution composition when oil shale is reacted with $CO_2$ at elevated temperature and pressure. $CO_2$ fugacity ($fCO_2(g)$), total dissolved inorganic carbon ($CO_{3aq,total}$), alkalinity (as bicarbonate), mid pH are calculated from total dissolved inorganic carbon concentration using carbonate equilibria.

FIG. 16 shows how the solution chemistry also supports the precipitation of carbonate solids during the experiment. The drop in both dissolved inorganic carbon and $CO_2$ fugacity ($f_{CO2}$) at 140° C. corresponds to the precipitation of carbonate minerals. The drop in both total dissolved inorganic carbon and $f_{CO2}$ requires precipitation of carbonate solids. If carbonate minerals did not precipitate, then a decrease in temperature would result in constant total dissolved $CO_2$ and decreasing $f_{CO2}$, and not a drop in both as was observed in this experiment.

This lack of formation of dawsonite in this experiment demonstrates the importance of controlling as well as $f_{CO2}$. FIG. 7 shows that a pH>5.5 is required for dawsonite precipitation at 100° C. The pH calculated from measured solution composition and dolomite equilibrium varies between pH 5 and 53 once $CO_2$ has been added to the depleted oil shale and brine mixture. Slightly more alkaline brines would yield dawsonite precipitation from dissolving illite.

Accordingly, the technology of the present application has been described with some degree o particularity directed to the exemplary embodiments and following experimental examples, it should be appreciated, though, that the technology of the present application is defined by the following claims construed in light of the prior art so that modifications or changes may be made to the exemplary embodiments without departing from the inventive concepts contained herein.

What is claimed is:

1. A method of sequestering carbon dioxide comprising:
   removing hydrocarbons from an underground region containing an oil shale formation wherein removing the hydrocarbons generates the carbon dioxide, and wherein removing the hydrocarbons comprises heating the underground region;
   injecting the carbon dioxide into the underground region, where the underground region previously included a clay mineral-rich oil shale deposit, where the clay mineral-rich oil shale deposit includes clay-rich shale containing iron sulfides;
   containing the carbon dioxide for a sufficient time to mineralize the carbon dioxide; and
   heating the carbon dioxide and generating iron cations, while the carbon dioxide is in the underground region, by selectively oxidizing the iron sulfides at a temperature below 350° C.

2. The method of claim 1 further comprising:
   preheating the carbon dioxide prior to injection into said underground region.

3. The method of claim 1 comprising:
   heating the carbon dioxide while in said underground region by oxidizing residual char.

4. The method of claim 1 wherein containing the carbon dioxide for a sufficient time to mineralize the carbon dioxide comprises containing the carbon dioxide in the underground region at a pressure of less than 2.0 times the hydrostatic pressure of the underground region.

5. The method of claim 4 wherein containing the carbon dioxide for a sufficient time to mineralize the carbon dioxide comprises containing the carbon dioxide in the underground region at a pressure of less than 1.5 times the hydrostatic pressure of the underground region.

6. The method of claim 5 wherein containing the carbon dioxide for a sufficient time to mineralize the carbon dioxide comprises containing the carbon dioxide in the underground region at a pressure of less than 1.2 times the hydrostatic pressure of the underground region.

7. The method of claim 6 wherein containing the carbon dioxide for a sufficient time to mineralize the carbon dioxide comprises containing the carbon dioxide in the underground region at a pressure of less than the hydrostatic pressure of the underground region.

8. The method of claim 7 wherein containing the carbon dioxide for a sufficient time to mineralize the carbon dioxide comprises containing the carbon dioxide in the underground region at a pressure of less than 0.8 times the hydrostatic pressure of the underground region.

9. The method of claim 1 further comprising injecting water in combination with said carbon dioxide to create a reaction environment comprising the water, the carbon dioxide, and the underground region.

10. The method of claim 9 further comprising preheating said water.

11. The method of claim 9 wherein said water contains dissolved salts.

12. The method of claim 9 wherein said water contains chemical compounds to increase the pH of the reaction environment.

13. The method of claim 1 further comprising injecting oxygen in combination with said carbon dioxide.

14. The method of claim 13 further comprising injecting water.

15. The method of claim 14 further comprising preheating said water.

16. The method of claim 14 wherein said water contains dissolved salts.

17. A method of sequestering carbon dioxide comprising:
   selecting an oil shale formation capable of containing gas pressures greater than 40 atmospheres, wherein the oil shale formation comprises kerogen;
   heating the kerogen in situ at a temperature below 400° C. for a first interval of time;
   removing oil and gas from the kerogen, resulting in depleted oil shale;
   injecting carbon dioxide into the depleted oil shale; and
   maintaining the temperature of the depleted oil shale between 100 and 350° C. for a second interval of time, thereby reacting said carbon dioxide with the depleted oil shale to form soluble bicarbonates and insoluble carbonates.

18. The method of claim 17 including cooling the depleted oil shale to its native temperature.

19. The method of claim 17 wherein said first interval of time is between one week and five years.

20. The method of claim 17 wherein said second interval of time is less than 10 years.

21. The method of claim 17 wherein maintaining said temperature includes injecting water in combination with said carbon dioxide.

22. The method of claim 21 further comprising preheating said water in combination with said carbon dioxide.

23. The method of claim 22 wherein said water contains dissolved salts.

24. The method of claim 17 wherein maintaining said temperature includes injecting oxygen in combination with said carbon dioxide.

25. The method of claim 24 wherein maintaining said temperature includes injecting water.

26. The method of claim 25 wherein said water contains dissolved salts.

27. The method of claim 17, wherein the oil shale formation includes kerogen, illite, dolomite, calcite, and sulfide minerals.

28. The method of claim 27 wherein said carbon dioxide reacts with the calcite to form dissolved bicarbonate minerals.

29. The method of claim 27 wherein said carbon dioxide reacts with the dolomite to form dissolved bicarbonate minerals.

30. The method of claim 29 wherein said carbon dioxide reacts with the dolomite according to the reaction $2CO_2 + dolomite + 2H_2O = Ca^{+2} + Mg^{+2} + 4HCO_3$.

31. The method of claim 27 wherein said carbon dioxide reacts with the sulfide minerals to form sulfate and carbonates.

32. The method of claim 31 wherein said carbon dioxide reacts with the sulfide according to the reaction $4FeS + 9O_2 + 2H_2O + 4CO_2 = 4Fe^{+3} + 4SO_4^{-2} + 4HCO_3^-$.

33. The method of claim 17 including maintaining the depleted oil shale at a temperature between 100 and 150° C., thereby reacting said carbon dioxide with the depleted oil shale to form solid carbonates.

34. The method of claim 33 wherein said carbon dioxide reacts with the depleted oil shale to form dawsonite.

35. The method of claim 33 wherein said carbon dioxide reacts with the depleted oil shale to form magnesite.

36. The method of claim 33 wherein said carbon dioxide reacts with the depleted oil shale to form siderite.

37. The method of claim 33 wherein maintaining said temperature includes adding oxygen to the depleted oil shale in order to oxidize pyrrhotite.

38. A system for sequestering carbon dioxide in an oil shale formation that includes kerogen, the system comprising:
a heater located in a heater well that extends into the oil shale formation, the heater operative to heat the kerogen in situ at a temperature below 400° C. for an interval of time, whereby oil and gas is released from the kerogen;
a production well extending into the oil shale formation that is capable of recovering oil and gas released from the kerogen, wherein the production well further recovers carbon dioxide; and
an injector operative to inject the carbon dioxide into the oil shale formation by pumping a mixture containing the carbon dioxide into the heater well, the mixture further containing oxygen, wherein the oxygen is operable to selectively oxidize iron sulfides contained in the oil shale formation to heat the carbon dioxide and to generate iron cations, thereby facilitating mineralization of the carbon dioxide.

* * * * *